United States Patent [19]
Kunze et al.

[11] Patent Number: 5,012,861
[45] Date of Patent: May 7, 1991

[54] MACHINE HOUSING

[75] Inventors: Volkmar Kunze, Heidenheim; Kurt Zimmermann, Satteldorf, both of Fed. Rep. of Germany; Erwin Hinterdorfer, Pölten, Austria

[73] Assignee: J. M. VoithGmbH, Fed. Rep. of Germany

[21] Appl. No.: 266,102

[22] Filed: Nov. 2, 1988

[30] Foreign Application Priority Data

Apr. 15, 1988 [DE] Fed. Rep. of Germany ... 8805009[U]

[51] Int. Cl.$^5$ .............................................. F16M 1/026
[52] U.S. Cl. .................................. 165/47; 74/606 A; 184/104.7
[58] Field of Search ................. 165/47; 74/606 A; 184/104.1, 104.2, 104.3

[56] References Cited

U.S. PATENT DOCUMENTS

| | | | |
|---|---|---|---|
| 1,950,034 | 3/1934 | Mulford et al. | 74/606 A |
| 2,391,186 | 12/1945 | Noble | 184/104.1 |
| 2,440,245 | 4/1948 | Chevigny | 165/47 |
| 2,511,479 | 6/1950 | Olah | 74/606 A |
| 2,756,614 | 7/1956 | Kobayashi | 74/606 A |
| 3,353,591 | 11/1967 | Zak | 74/606 A |
| 4,114,477 | 9/1978 | Iverson | 74/606 A |
| 4,630,945 | 12/1986 | Oerling | 165/47 |

FOREIGN PATENT DOCUMENTS

| | | |
|---|---|---|
| 2162243 | 6/1973 | Fed. Rep. of Germany . |
| 88436 | 3/1972 | German Democratic Rep. . |
| 1366465 | 9/1974 | United Kingdom . |
| 1409906 | 10/1975 | United Kingdom . |

OTHER PUBLICATIONS

*American Machinist*, Jan. 4, 1945, p. 179 Advertisement for Air Cooled Worm Gear Speed Reducer.

Primary Examiner—John Ford
Attorney, Agent, or Firm—Ostrolenk, Faber, Gerb & Soffen

[57] ABSTRACT

A machine housing having one wall with an outer side provided with ribs for the discharge of heat to the surrounding air. The ribs define undulation crests and there are curved undulation bases between the undulation crests. The ratio between the wall thickness and the rib height and the ratio between the rib pitch or spacing of the wall thickness and the radius of curvature of the undulations as compared with the wall thickness are all recited. The ribs preferably are parallel and preferably extend vertically in the installed position of the machine housing.

7 Claims, 1 Drawing Sheet

MACHINE HOUSING

BACKGROUND OF INVENTION

The present invention refers to a machine housing at least one of the walls of which is provided on its outer side with ribs for the discharge of heat to the surrounding air. The housing is preferably that of a gear transmission. In known machine housings of this type the height of the ribs is generally equal to at least the thickness of the wall and frequently is even substantially greater than the thickness of the wall. In this way, it is attempted to obtain a paticularly large removal of heat. The rib pitch, i.e. the distance between ribs, is usually relatively small, since it is generally desired to have the largest possible number of ribs. One disadvantage of this known machine housing is its relatively great weight and danger of dirtying, impairing the removal of heat. Difficulties also arise upon the casting of such known machine housings.

SUMMARY OF THE INVENTION

The object of the present invention is, therefore, to improve the known machine housing in such a manner that good removal of heat is combined with relatively low weight and ease of manufacture, particularly upon casting.

This object is achieved by the features set forth below. At least one of the walls of the machine housing has an outer side with ribs on it for discharging heat to surrounding air. The wall has a measured thickness and the ribs on the wall have measured height above the wall thickness and there is a measured pitch between neighboring ribs. In the preferred embodiment, the ratio between the wall thickness and the rib height above the wall thickness is in the range of 3:1 to 1:1 and the ratio between the rib pitch and the wall thickness is in the range of 5:1 to 1:1. Stated differently, the ribs should be of relatively small height and be arranged at a relatively large distance from each other (i.e., have a large rib pitch). It has been found that, in this way, an optimal combination of many favorable properties is obtained, namely relatively low weight combined with great rigidity and low emission of noise. At the same time, the outside of the ribbed walls still has a sufficiently enlarged surface and thus still rather high heat removability. The ease of shaping upon the casting of the housing parts is particularly favorable. Finally, as a result of the relatively large rib pitch, the danger of the dirtying of the outside of the machine housing is substantially reduced. In other words, as a result of the relatively large rib pitch, dirt does not accumulate between the ribs.

In the preferred embodiment, the ratio between the wall thickness and the rib height above the wall thickness is in the range of 2.5:1 to 1.:31 and the ratio between the rib pitch and the wall thickness is in the range of 3.5:1 to 2.0:1.

In a section through the housing wall, the outer surface of the housing wall is of undulating shape. Between every two ribs, that is between the undulation crests, there is an undulation base having a curvature of a radius which is in the range of 0.7 to 1.3 times the thickness of the wall. In the preferred arrangement, that radius of curvature is at least approximately equal to the wall thickness.

In particular, the inventive shape of the outside of the machine housing is substantially different from the shape of rib heretofore customary, and the shape of the housing outer surface in accordance with the invention can better be referred to as "undulated". Furthermore, the ribs and undulation crests generally extend vertically in the installed position of the machine housing.

DESCRIPTION OF A PREFERRED EMBODIMENT

Figure 1:
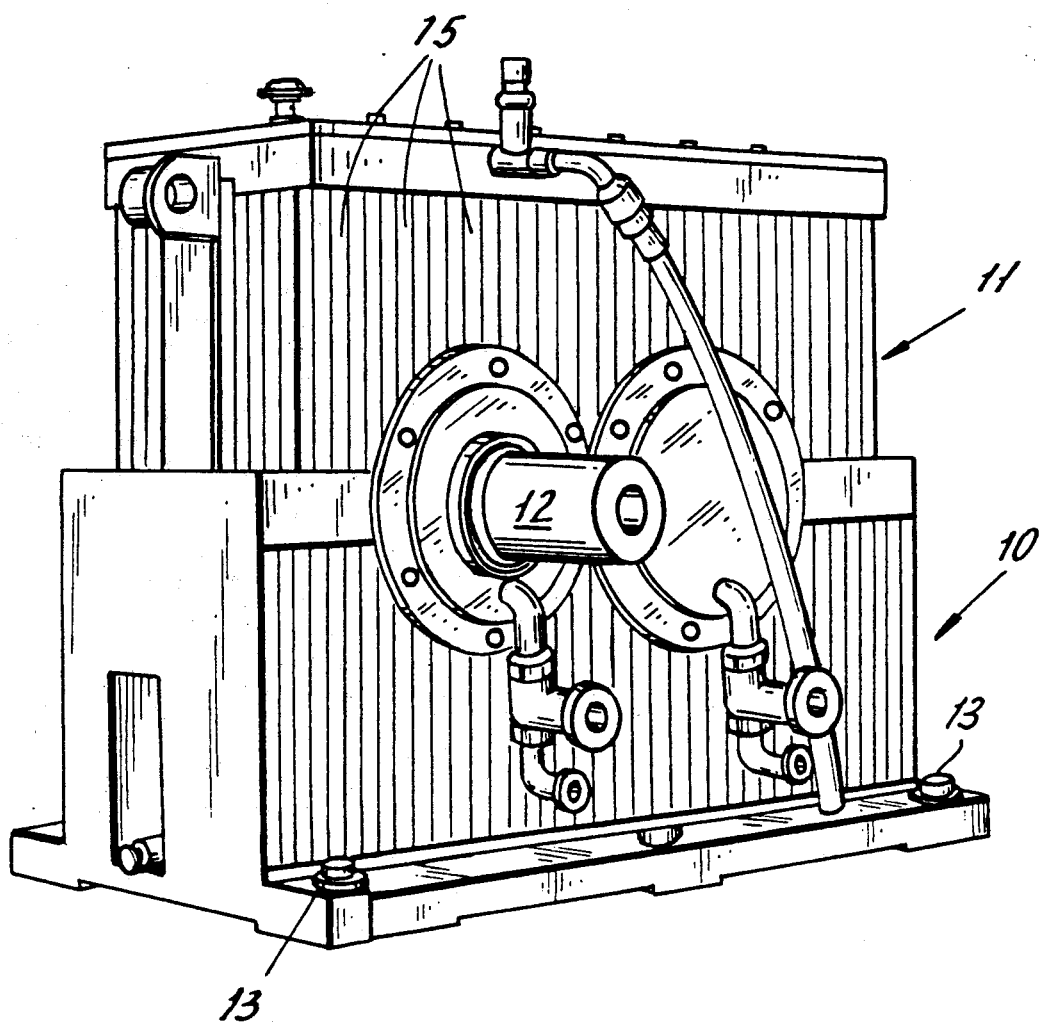
FIG. 1 is an oblique view of a transmission housing in accordance with the invention.

In the gear transmission shown in FIG. 1, one can note essentially a housing lower part 10, a housing upper part 11 and a driven shaft 12. The transmission housing is fastened by bolts 13 in the customary manner to a base, foundation or the like, not shown in the drawing.

As can be seen, the walls of the housing extend within vertical planes. The outer surfaces of the walls of the upper part 11 of the housing, and predominantly also the outer surfaces of the walls of the lower part 10 of the housing have ribs 15 or, more particularly stated, undulations—which extend in vertical direction. As a result of this vertical orientation of the undulations the danger of dirt depositing on the housing and reducing the ability to discharge heat is substantially less than in known machine housings. In other words, the vertical orientation of the ribs 15 prevents dirt from accumulating. This increases the ability of the ribs 15 to discharge heat.

Figure 2:
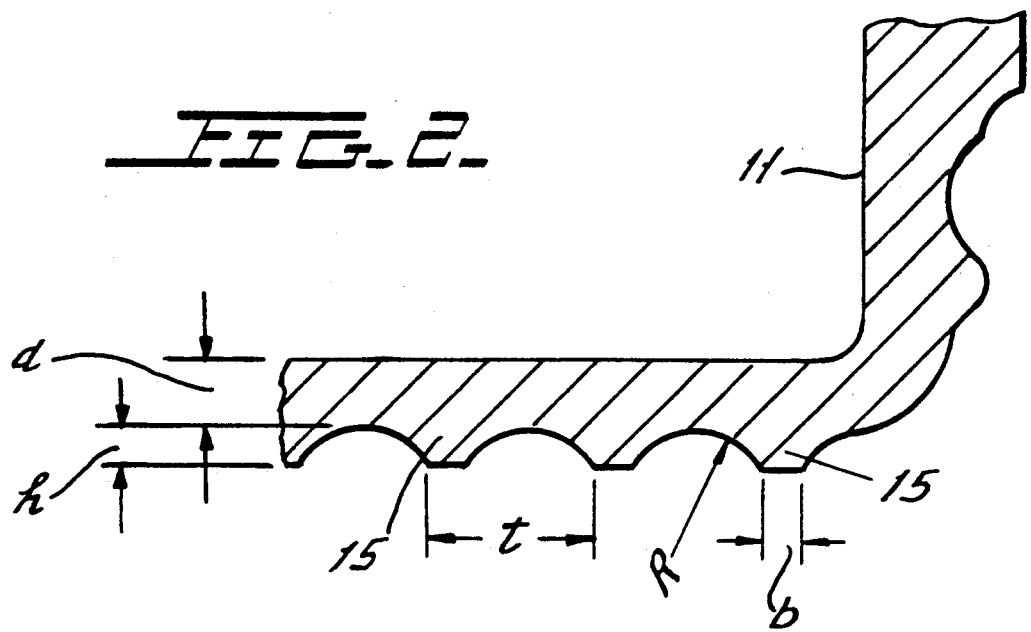
FIG. 2 is a partial section through the wall of the transmission housing.

FIG. 2 shows a portion of the upper part 11 of the housing in a horizontal cross section. The wall thickness is designated d, and the height of the ribs or wave crests 15 is designated h, while the rib pitch (distance between two adjacent ribs or "length of undulation") is designated t and the radius of curvature of the root between two ribs 15 is designated R.

In the example shown, the ratio between the wall thickness d and the height of rib h is only about 1.8:1. The ratio between the rib pitch t and the wall thickness is about 2.5:1. The base between two wave crests 15 is rounded, with a large radius of curvature R which is somewhat greater than the wall thickness d. In other words, the radius of curvature R is about twice the height h of the wave crests 15 or undulations. The width b of the head of each undulation 15 is only about ¼ or 1/5 of the rib pitch t.

We claim:

1. A transmission housing having a plurality of walls, at least one of the walls of the housing extending within an essentially vertical plane in the installed position of the transmission housing, the wall having an outer side;

the wall including a plurality of ribs for discharging heat from the wall to surrounding air, the ribs being defined on and extending along the outer side of the wall, the ribs being essentially vertical in the installed position of the transmission housing so as to prevent dirt from accumulating between the ribs;

the wall having a first thickness between the ribs and a second thickness at the ribs, the second thickness being greater than the first thickness, the height of the ribs being equal to the second thickness minus the first thickness, the ratio between the first thickness and the height of the ribs being in the range of 3:1 to 1:1, the ribs being spaced apart from each other at a rib pitch, the ratio between the rib pitch and the first thickness being in the range of 5:1 to 1:1;

wherein in a section through the housing wall through the ribs, the other side of the housing wall is of undulating shape, and between each two ribs, which define undulation crests, there is an undulation base having an inwardly directed, substantially constant curvature.

2. The housing of claim 1, wherein the radius of curvature of the undulation base is in the range of 0.7 to 1.3 times the first wall thickness.

3. The housing of claim 1, wherein the radius of curvature is at least approximately equal to the first wall thickness.

4. The housing of claim 1, wherein the ribs are parallel.

5. The housing of claim 1, wherein the ratio between the first wall thickness and the rib height is in the range of 2.5:1 to 1.3:1.

6. The housing of claim 1, wherein the ratio between the rib pitch and the first wall thickness is in the range of 3.5:1 to 2.0:1.

7. The housing of claim 6, wherein the ratio between the first wall thickness and the rib height is in the range of 2.5:1 to 1.3:1.

* * * * *